United States Patent
Couture et al.

(10) Patent No.: US 9,329,260 B2
(45) Date of Patent: May 3, 2016

(54) METHOD AND DEVICE FOR ULTRASOUND IMAGING

(75) Inventors: Olivier Couture, Moulineaux (FR); Mickael Tanter, Bagneux (FR); Mathias Fink, Meudon (FR)

(73) Assignees: CENTRE NATIONALE DE LA RECHERCHE SCIENTIFIQUE—CNRS, Paris (FR); INSERM (INSTITUT NATIONAL DE LA SANTE ET DE LA RECHERCHE MEDICALE), Paris (FR); UNIVERSITE PARIS DIDEROT—PARIS 7, Paris (FR)

( * ) Notice: Subject to any disclaimer, the term of this patent is extended or adjusted under 35 U.S.C. 154(b) by 500 days.

(21) Appl. No.: 13/993,224

(22) PCT Filed: Nov. 29, 2011

(86) PCT No.: PCT/FR2011/052810
§ 371 (c)(1),
(2), (4) Date: Jul. 17, 2013

(87) PCT Pub. No.: WO2012/080614
PCT Pub. Date: Jun. 21, 2012

(65) Prior Publication Data
US 2013/0301382 A1    Nov. 14, 2013

(30) Foreign Application Priority Data
Dec. 16, 2010  (FR) ........................... 10 60633

(51) Int. Cl.
*G01S 7/52*    (2006.01)

(52) U.S. Cl.
CPC ............... *G01S 7/52* (2013.01); *G01S 7/52041* (2013.01); *G01S 7/52046* (2013.01)

(58) Field of Classification Search
CPC .... G01S 7/52041; G01S 7/52046; G01S 7/52
USPC ........................... 600/437–461; 367/7
See application file for complete search history.

(56) References Cited

U.S. PATENT DOCUMENTS

| 8,708,909 B2 * | 4/2014 | Goertz ................. A61K 49/223 600/407 |
| 2006/0064015 A1 * | 3/2006 | Davies ................ G01S 7/52028 600/447 |

(Continued)

OTHER PUBLICATIONS

Kirkhorn, et al.; *Three-Stage Approach to Ultrasound Contrast Detection*; journal; vol. 48, No. 4; Jul. 2001; pp. 1013-1022.

(Continued)

*Primary Examiner* — Luke Ratcliffe
*Assistant Examiner* — Amienatta M Ndure Jobe
(74) *Attorney, Agent, or Firm* — Miller, Matthias & Hull LLP

(57) ABSTRACT

A method of high-resolution ultrasound imaging, in which transducers are made to emit ultrasound waves in a field of observations containing micro bubbles, by making the micro bubbles burst one by one in tandem with the emissions of ultrasound waves. At each shot j of an ultrasound wave, raw reverberated signals $S_j(i,t)$ picked up by each transducer i are recorded, and then differential signals $V_j(i,t)$ representative of variations between successive raw signals are determined, a parabolic function $P_j(x)$ is fitted to the differential signals corresponding to each shot j, and then a crest $A_j(x_0,y_0)$ of this function $P_j$, corresponding to the position of the micro bubble destroyed between shots j−1 and j, is determined.

14 Claims, 2 Drawing Sheets

(56) References Cited

U.S. PATENT DOCUMENTS

| | | | |
|---|---|---|---|
| 2006/0084859 A1* | 4/2006 | Johnson | A61B 5/0507 600/407 |
| 2006/0235302 A1* | 10/2006 | Grossman | A61B 8/08 600/443 |
| 2007/0287912 A1* | 12/2007 | Khuri-Yakub | A61B 5/0059 600/439 |
| 2007/0299341 A1* | 12/2007 | Wang | A61B 5/0091 600/443 |
| 2008/0319375 A1* | 12/2008 | Hardy | A61K 9/0009 604/22 |
| 2009/0304246 A1* | 12/2009 | Walker | G01S 5/52034 382/128 |

OTHER PUBLICATIONS

Ting, et al; *Fluorescent Probes for Super-Resolution Imaging in Living Cells*; journal; vol. 9; Dec. 2008; pp. 929-943.

Couture, et al.; *Ultrafast Imaging of Ultrasound Contrast Agents*; journal; vol. 35. No. 11;2009; pp. 1908-1906;.

Betzig, et al; *Imaging Intracellular Fluorescent Proteins at Nanometer Resolution*; journal; vol. 313; Sep. 15, 2006; pp. 1642-1645.

Dayton, et al.; *Molecular Ultrasound Imaging Using Microbubble Contrast Agents*; book; Sep. 1, 2007; pp. 5124-5142.

Hess, et al; *Ultra-High Resolution Imaging by Fluorescence Photoactivation Localization Micrscopy*; journal; vol. 91, Dec. 2006; pp. 4258-4272.

International Search Report and Written Opinion for related International Application No. PCT/FR2011/052810; report dated Jan. 23, 2012.

Hess, et al.; *Ultr-High Resolution Imaging by Fluorescence Photoactivation Localization Microscopy*; journal; Dec. 2006; pp. 4258-4272; vol. 91.

Clement, et al.; *Superresolution Ultrasound Imaging Using Back-Projected Reconstruction*; journal; Dec. 2005; pp. 3953-3960; vol. 118, No. 6.

\* cited by examiner

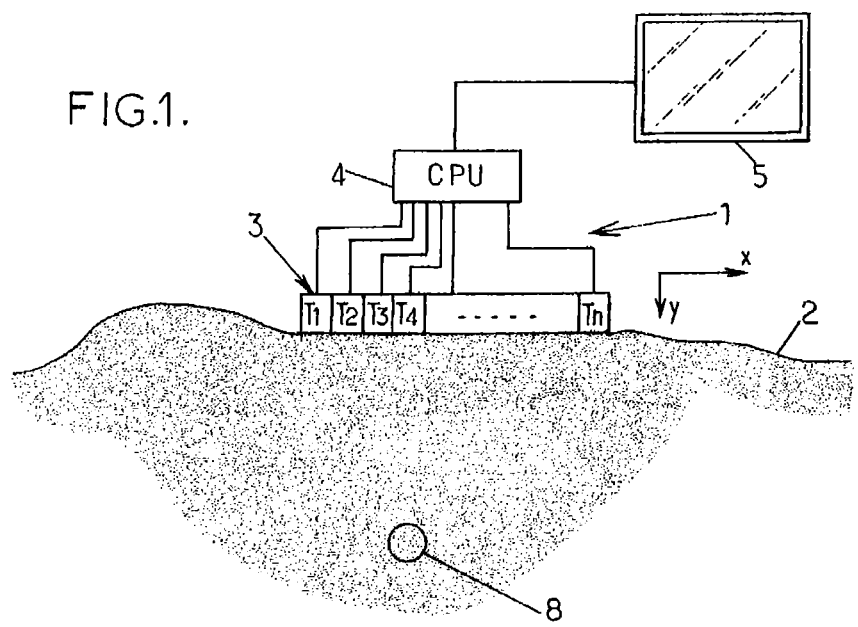
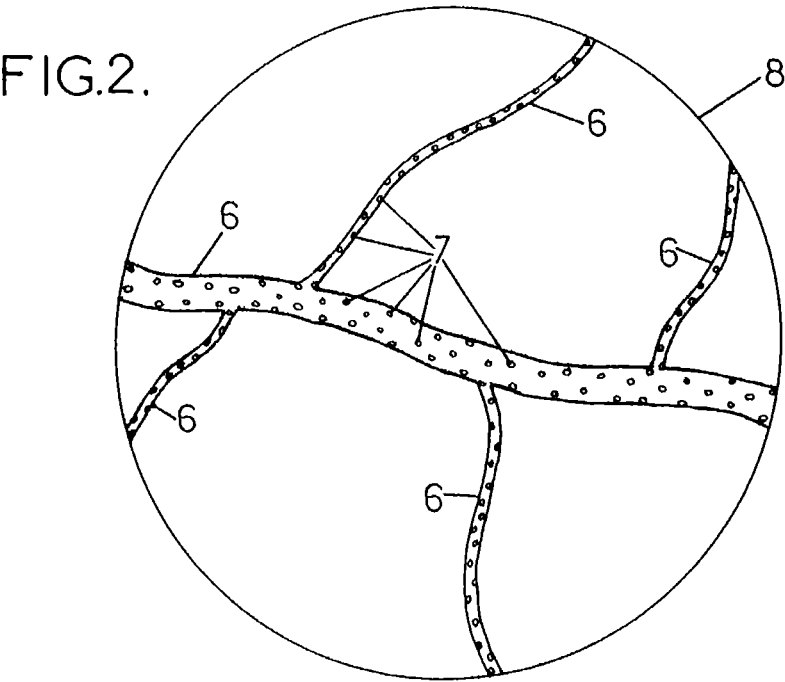

METHOD AND DEVICE FOR ULTRASOUND IMAGING

CROSS-REFERENCE TO RELATED APPLICATIONS

This application is a 35 USC §371 U.S. national stage filing of International Patent Application No. PCT/FR2011/052810 filed on Nov. 29, 2011, which claims priority under the Paris Convention and 35 USC §119 to French Patent Application No. 10 60633, filed on Dec. 16, 2010.

FIELD OF THE DISCLOSURE

This invention relates to methods and devices for ultrasound imaging.

BACKGROUND OF THE DISCLOSURE

More particularly, the invention concerns an ultrasound imaging method for imaging a field of observation in an environment to be imaged containing scatterers, said method comprising several successive measurement steps during each of which:
- an array of transducers emits an incident ultrasound wave into the field of observation, of center wavelength $\lambda$,
- then raw signals $S_j(i,t)$ picked up by each transducer and representative of a reflected ultrasound wave reverberated from the incident wave by the scatterers in the environment are recorded, where i is an index denoting each transducer, j is an index denoting each measurement step, and t denotes the time, the array of transducers extending along at least one dimension and the incident waves mainly being propagated in a direction of propagation perpendicular to the array of transducers.

In known methods of this type, the raw signals from different transducers are combined together for each shot, for example by beamforming, to obtain the images corresponding to each shot. The resolution of the image is normally limited to $\lambda/2$, where $\lambda$ is the ultrasound wavelength (for ultrasounds at 1.5 MHz, $\lambda$ is of the order of 1 mm in soft human tissue).

One particular objective of the present invention is to obtain an ultrasound image of a resolution better than $\lambda/2$.

SUMMARY OF THE DISCLOSURE

To this end, according to the invention, a method of the type in question is characterized by a maximum number C of differential targets being generated, differing from one measurement step to another, each differential target being a scatterer present in the field of observation during a measurement step and absent during an immediately adjacent measurement step,
the number C being at most equal to $INT(A/(5\lambda)^2)+1$, where A is an area of the field of observation,
and by said method further comprising the following steps:
- a differential processing step during which the raw signals $S_j(i,t)$ corresponding to successive measurement steps of index j are compared in order to extract differential signals $V_j(i,t)$ representative of variations between raw signals from the successive measurement steps,
- an adjustment step during which at least one function $y=P_j(x)$ corresponding to each differential signal $V_j(i,t)$ is determined, where x is a space variable denoting a position perpendicular to the direction of propagation and y is a coordinate denoting the position of a point along the direction of propagation corresponding to a travel time t ($y=c \cdot t/2$ if t is the round-trip time between the transmission of the incident wave and the detection of the reflected wave),
- and a positioning step during which a crest $A_j(x_0,y_0)$ of said function $P_j$, corresponding to the position of the differential target, is determined.

Note that the differential targets mentioned above may for example correspond to the successive destruction of micro bubbles or similar under the effect of ultrasound waves.

With these arrangements, the scatterers constituting the differential targets mentioned above are activated individually and identified individually from the raw signals picked up and not from an already constructed image, so it is possible to position them very accurately within the space with a precision much lower than $\lambda/2$, for example down to $\lambda/200$. The positions of the scatterers identified in this manner may then be used to build an image of the environment at a resolution much lower than $\lambda/2$, for example on the order of $\lambda/50$ to $\lambda/200$. The proposed invention thus allows very significantly improving the resolution of the ultrasonic image.

More specifically, the invention makes it possible to activate only a limited number of scatterers at once in order to distinguish the individual wavefront from the target to be pinpointed. Given that the wavefront is no longer a superimposition of the echo from multiple targets, its form is defined with precision by the position of a distinct scatterer. This position may be established to within a few micrometers. In order to activate only a limited number of scatterers, the invention may exploit various threshold effects generating or eliminating one-off ultrasound scatterers: in particular, ultrasound contrast agents (microbubbles, microdroplets, or liposomes) are affected by ultrasounds which can cause them to burst or vaporize. This generates a target which appears and/or disappears in a very short time, on the order of a millisecond or a few milliseconds. The wavefront associated with this one-off scatterer can be obtained by subtracting the backscattered signals when the target is present from the backscattered signals when the target is absent.

In various embodiments of the method according to the invention, it is possible to make use of one or more of the following arrangements:
- the number C is at most equal to 2, preferably being equal to 1;
- during the adjustment step, the function $y=P_j(x)$ is determined by adjusting said function to minimize deviations with points $D_j(x_i,y_i)$, where $x_i$ is a space variable denoting a position of each transducer i perpendicularly to the direction of propagation and $y_i$ is a coordinate denoting the position of a point along the direction of propagation corresponding to a travel time $t_i$ characteristic of the signal $V_j(i,t)$ (it can, for example, relate to the maximum of the signal $V_j(i,t)$ or the wavefront of the signal $V_j(i,t)$, or other);
- said function P is parabolic;
- the differential processing step comprises a sub-step of calculating raw differential signals, during which raw differential signals $Vb_j(i,t)=S_j(i,t)-S_{j-1}(i,t)$ are determined;
- the differential processing step comprises a sub-step of calculating raw differential signals, during which raw differential signals $Vb_j(i,t)$ are determined at least by a high-pass filtering of raw signals $S_j(i,t)$ on j;
- the differential processing step further comprises a sub-step of determining an envelope, during which the differential signals $V_j(i,t)$ are determined by calculating a temporal envelope of each raw differential signal $Vb_j(i,t)$;

during the differential processing step, the raw differential signals undergo a temporal low-pass filtering on t before the sub-step of determining an envelope;

the sub-step of determining an envelope comprises a calculation of a temporal envelope $Ve_j(i,t)$ then a low-pass filtering of the temporal envelopes $Ve_j(i,t)$ on i in order to obtain the differential signals $V_j(i,t)$;

the field of observation comprises micro bubbles which constitute said scatterers and the micro bubbles which have disappeared from the field of observation from one measurement step to another are detected, these micro bubbles that have disappeared constituting said differential targets;

the incident wave emitted has an amplitude suitable for destroying the maximum number C of micro bubbles in each measurement step;

the incident wave emitted in each measurement step has an amplitude suitable for not destroying micro bubbles, and the method further comprises, alternating with the measurement steps, destruction steps during which a destructive ultrasound wave is emitted that has an amplitude suitable for destroying the maximum number C of micro bubbles in each destruction step;

the positions $A_j(x_0,y_0)$ of the successive differential targets are plotted on an image of the field of observation (obtained by an imaging method selected from among ultrasound, radiology, MRI, etc.);

said image of the field of observation is obtained by ultrasonography using said array of transducers.

Another object of the invention is a device for carrying out a method as defined above, this device comprising an array of transducers controlled by a control and processing device adapted for imaging a field of observation in an environment to be imaged containing scatterers, the control and processing device being adapted for, during a plurality of successive measurement steps:

causing the array of transducers to emit an incident ultrasound wave into the field of observation in each measurement step, then recording raw signals $S_j(i,t)$ picked up by each transducer and representative of a reflected ultrasound wave reverberated from the incident wave by the scatterers of the environment, i being an index denoting each sensor, j being an index denoting each measurement step, and t denoting the time, the array of transducers extending in at most two dimensions and the incident waves mainly propagating in a direction of propagation perpendicular to the array of transducers, characterized in that the control and processing device is adapted to generate a maximum number C of differential targets, differing from one measurement step to another, each differential target being a scatterer which is present in the field of observation during a measurement step and absent during an immediately adjacent measurement step, and in that the control and processing device is further adapted to further carry out the following steps:

a differential processing step during which the raw signals $S_j(i,t)$ corresponding to successive measurement steps of index j are compared in order to extract differential signals $V_j(i,t)$ that are representative of variations between raw signals from successive measurement steps, an adjustment step during which at least one function $y=P_j(x)$ corresponding to each differential signal $V_j(i,t)$ is determined, where x is a space variable denoting a position perpendicular to the direction of propagation and y is a coordinate denoting the position of a point along the direction of propagation corresponding to a travel time t, and a positioning step during which a crest $A_j(x_0,y_0)$ of said function $P_j$ is determined, corresponding to the position of the differential target.

BRIEF DESCRIPTION OF THE DRAWINGS

Other features and advantages of the invention will become apparent from the following description of one of its embodiments, provided as a non-limiting example, with respect to the attached drawings.

In the drawings:

FIG. 1 is a schematic view of an ultrasound imaging device according to one embodiment of the invention, FIG. 2 is a diagram showing details of the environment to be imaged.

DETAILED DESCRIPTION OF THE DISCLOSURE

Figure 3:
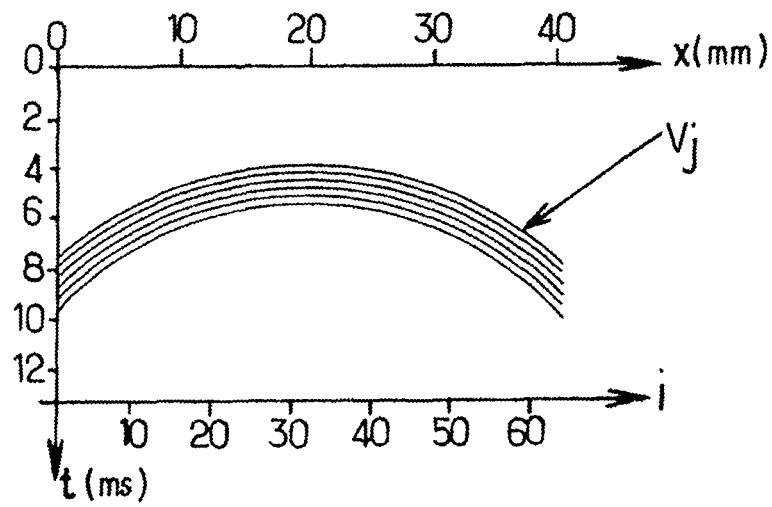
FIG. 3 is a graph representing the differential signals $V_j$ obtained by the imaging process according to an embodiment of the invention.
Figure 4:
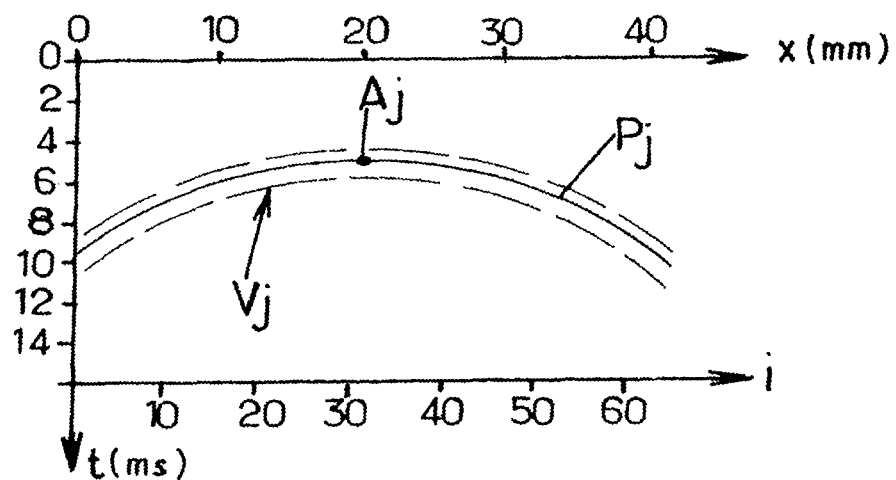
FIG. 4 is a graph similar to FIG. 3, showing a parabolic curve $P_j$ fitted to the differential signals $V_j$ and the position of the crest $A_j$ of this curve, corresponding to a differential target which is positioned in the environment to be imaged with a precision far below the wavelength of the ultrasound waves used.

FIG. 1 shows an example of a device 1 adapted for imaging an environment 2 (for example a part of a patient's body) by transmitting and receiving compressional ultrasound waves, particularly in a field of observation 8. The environment 2 is scattering for the ultrasound waves, i.e, it is heterogeneous and/or contains randomly distributed scatterers that may reflect the emitted ultrasound waves in the environment 2.

The imaging device represented in FIG. 1 comprises an array 3 of transducers $T_1$-$T_n$, for example a linear array extending along an X axis (or along two axes in the case where the array 3 is two dimensional), or, if applicable, a two-dimensional array. This array 3 comprises a number n of transducers, n being, for example, between 50 and 500, or possibly higher than 5000 for a two-dimensional array. For example a linear array of 60 to 100 transducers can be used, each having a width, for example, of less than 1 mm along the X axis.

The array 3 of transducers is controlled by a control and processing device 4 (CPU), for example one central processing unit or a plurality of central processing units. The control and processing device 4 is adapted for individually controlling the transducers of the array 3 and for recording and processing the signals backscattered by the environment 2 so as to make an image of the environment.

In the example considered, the imaging device 1 further comprises a screen 5 or any other user interface for viewing an image of the field of observation such as the one represented in FIG. 2, which shows capillary vessels 6 of a human body 2, vessels in which are circulating micro bubbles 7 or similar objects previously injected into the environment 2 (for example into the bloodstream) and constituting scatterers capable of backscattering the ultrasound waves emitted by the array 3 of transducers.

These micro bubbles can, for example, be of the type described by Dayton et al. [*Molecular ultrasound imaging*

*using microbubble contrast agent—Frontiers in Bioscience* 12, 5124-5142—*September* 2007].

The control and processing device 4 is adapted (programmed) to carry out the imaging method described below, consisting of:

(a) a plurality of measurement steps during which the control and processing device 4 records raw signals, (a') these measurement steps possibly being separated by micro bubble destruction steps, (b) at least one step of differential processing of raw signals in order to obtain differential signals representative of differential targets constituted during the destruction of micro bubbles, (c) at least one adjustment step during which a parabolic curve is fitted to each differential signal, (d) and at least one positioning step during which a crest of each parabolic curve, corresponding to the position of the differential target, is determined.

(a) Measurement Step:

The method comprises a plurality of successive measurement steps, numbering N, for example approximately 400 measurement steps repeated approximately every ms or less.

During each of these measurement steps, an incident ultrasound wave is transmitted by the array 3 of transducers in the field of observation 8, for example a plane wave or possibly a focused wave, then the raw signals $S_j(i,t)$ picked up by each transducer $T_1$-$T_n$ and representative of a reflected ultrasound wave reverberated from the incident wave by the scatterers of the environment are recorded, i being an index denoting each transducer, j being an index denoting each measurement step, and t denoting the time.

Note that the raw signals are not ultrasound images, as the creation of an ultrasound image requires processing the raw signals, for example by beamforming.

At least one of the measurement steps may, however, be used to establish an ultrasound image of the field of observation 8 by the control and processing device 4, at a conventional millimeter resolution, this image then being superimposed onto the positions of the differential targets obtained in step (e) described below. It is possible for ultrasound images to be produced by the control and processing device 4 in multiple measurement steps or in each measurement step, to take into account possible deformations of the environment 2 during the course of the method.

In the invention, a low number C of micro bubbles is destroyed from one measurement step to the next. C is a maximum number of micro bubbles destroyed in the field of observation 8 from one measurement step to the next. Each destroyed micro bubble will here be called a differential target. More generally, the differential targets can be scatterers which disappear or appear from one measurement step to the next, i.e., scatterers present in the field of observation during a measurement step and absent during an immediately adjacent measurement step.

The number C is generally at most equal to 2, preferably at most equal to 1. More generally, the number C can be at most equal to $INT(A/(5\lambda)^2)+1$, where A is an area of the field of observation and INT is a function that returns the integer portion.

Destruction of Micro Bubbles:

To destroy the micro bubbles, the control and processing unit 4 causes the array 3 of transducers to transmit ultrasound waves (for example plane waves or possibly focused waves) of an amplitude just sufficient to destroy said maximum number C of micro bubbles. This amplitude can be determined empirically during an initial adjustment step (in this case the quantity of micro bubbles destroyed at each ultrasound wave shot is determined by ultrasonography), or it can be determined (empirically or by calculation) in advance according to the operating conditions.

These ultrasound waves used to destroy one or several micro bubble(s) at each shot, can be:

either the incident waves emitted at each measurement step, in which case the method will not comprise a specific micro bubble destruction step, or destructive ultrasound waves of an amplitude greater than the incident waves of the measurement steps, said destructive waves each being emitted during a micro bubble destruction step (a') inserted between two measurement steps (a).

(b) Differential Processing Step:

After recording the raw signals $S_j(i,t)$, the next step is the differential processing step, which may start after recording all the raw signals or simply after recording the first raw signals, this then partially taking place while the other raw signals are being recorded.

During this differential processing step, the control and processing device 4 compares the raw signals $S_j(i,t)$ corresponding to the successive measurement steps of index j, in order to extract the differential signals $V_j(i,t)$ representative of variations between raw signals from successive measurement steps. These signals, corresponding to isolated one-off events, are generally pulsed on each receiving channel, i.e., on each transducer.

This differential processing step may itself comprise several sub-steps, which for example are linked together as follows:

(b1) Sub-Step for Calculating Raw Differential Signals

During this sub-step, the control and processing device 4 calculates the raw differential signals $Vb_j(i,t)$.

These raw differential signals $Vb_j(i,t)$ can be obtained, for example, in two ways from raw signals $S_j(i,t)$:

either by calculating differences: $Vb_j(i,t)=S_j(i,t)-S_{j-1}(i,t)$, for j=2 to N;

or by a high-pass filtering of raw signals $S_j(i,t)$, the filtering being done on j in order to retain only the rapid changes between the raw signals obtained in the different measurement steps j.

(b2) Temporal Low-Pass Filtering on t

The control and processing device 4 may possibly then proceed to a sub-step of temporal low-pass filtering on t, of raw differential signals $Vb_j(i,t)$.

(b3) Determining an Envelope

The control and processing device 4 may then proceed to a sub-step of determining an envelope during which the differential signals $V_j(i,t)$ are determined by:

calculating a temporal envelope $Ve_j(i,t)$ of the filtered raw differential signals $Vb_j(i,t)$ from sub-step (b2), then performing a low-pass filtering on i of the temporal envelopes $Ve_j(i,t)$ in order to obtain the differential signals $V_j(i,t)$.

(c) Adjustment Step

The control and processing device 4 then proceeds to an adjustment step during which at least one function $y=P_j(x)$ corresponding to each differential signal $V_j(i,t)$ is determined.

To do this, the control and processing device 4 first determines the maxima $V_j(i,t_i)$ of $V_j(i,t)$ for each transducer i, and for each measurement step j>1.

Then the control and processing device 4 deduces the corresponding points $D_j(x_i,y_i)$ of the field of observation 8, where:

$x_i$ is a space variable denoting a position of each transducer i perpendicular to the direction of propagation (i.e., a one-dimensional variable consisting simply of an x coordinate along the x axis in the case considered here, or in the case of a two-dimensional array 3, a two-dimensional variable comprising two coordinates along two axes), and $y_i$ is a coordinate denoting the position of a point along the direction of propagation corresponding to the travel time $t_i$ for which $V_j(i,t)$ is at its maximum ($y_i=c \cdot t_i/2$, where c is the velocity of the ultrasound wave).

Note that, more generally, these points $D_j(x_i,y_i)$ could be determined with values $y_i$ denoting the position of a point along the direction of propagation corresponding to a travel time $t_i$ characteristic of the signal $V_j(i,t)$: this time can, for example, correspond to the maximum of the signal $V_j(i,t)$ as described above, or correspond to the wavefront of the signal $V_j(i,t)$, or other.

Next, the control and processing device 4 determines for each measurement step j>1, a function $y=P_j(x)$ which is adjusted to minimize the deviations with the points $D_j(x_i,y_i)$ (for example, the squared deviation $$\sum_j (Pj(x_i) - y_i)^2$$

is minimized). The function $y=P_j(x)$ is a continuous function on x, preferably a second degree polynomial function (parabolic). This function corresponds to a parabola for a linear array 3 such as described here, or a paraboloid for a two-dimensional array 3.

(d) Positioning Step

Lastly, the control and processing device 4 proceeds to a positioning step for the differential target of each measurement step j>1, or in simplified terms, a positioning of the micro bubble that disappeared between measurement steps j−1 and j. To this end, the control and processing device 4 determines the crest $A_j(x_0,y_0)$ of the function $P_j$ mentioned above, and this crest corresponds to the position of the differential target, determined with a resolution clearly below the wavelengths of the ultrasound waves used, for example on the order of λ/50 to λ/200.

The positions $A_j(x_0,y_0)$ of the successive differential targets can then be advantageously plotted on the image of the field of observation 8, obtained for example by ultrasonography as indicated above (or on any other image of the field of observation, obtained for example by radiography, MRI, or other means), so as to obtain a very high resolution image of the field of observation 8.

Steps (c) and (d) mentioned above may be carried out once all the differential signals have been determined, or as and when these differential signals $V_j(i,t)$ are calculated.

One will also note that the differential signals mentioned above can correspond to the creation of micro bubbles or other scatterers, for example cavitation bubbles obtained between measurement steps by focusing ultrasound or by photoacoustic effect, using in particular the array 3 of transducers.

The invention claimed is:

1. An ultrasound imaging method for imaging a field of observation in an environment to be imaged containing scatterers, said method comprising several successive measurement steps during each of which:

an array of transducers emits an incident ultrasound wave into the field of observation, of center wavelength λ, then raw signals Sj(i,t) picked up by each transducer and representative of a reflected ultrasound wave reverberated from the incident wave by the scatterers in the environment are recorded, i being an index denoting each transducer, j being an index denoting each measurement step, and t denoting the time, the array of transducers extending along at least one dimension and the incident waves mainly being propagated in a direction of propagation perpendicular to the array of transducers, wherein a maximum number C of differential targets is generated, differing from one measurement step to another, each differential target being a scatterer which is present in the field of observation during a measurement step and absent during an immediately adjacent measurement step, the number C being at most equal to $INT(A/(5\lambda)^2)+1$, where A is an area of the field of observation, and wherein said method further comprises the following steps:

a differential processing step during which the raw signals Sj(i,t) corresponding to successive measurement steps of index j are compared in order to extract differential signals Vj(i,t) representative of variations between raw signals from the successive measurement steps, an adjustment step during which at least one function y=Pj(x) corresponding to each differential signal Vj(i,t) is determined, where x is a space variable denoting a position perpendicular to the direction of propagation and y is a coordinate denoting the position of a point along the direction of propagation corresponding to a travel time t, and a positioning step during which a crest Aj(x0,y0) of said function Pj is determined, corresponding to the position of the differential target.

2. The method according to claim 1, wherein the number C is at most equal to 2, preferably being equal to 1.

3. The method according to claim 1, wherein, during the adjustment step, the function y=Pj(x) is determined by adjusting said function to minimize deviations with points Dj(xi, yi), where xi is a space variable denoting a position of each transducer i perpendicularly to the direction of propagation and yi is a coordinate denoting the position of a point along the direction of propagation corresponding to a travel time ti characteristic of the signal Vj(i,t).

4. The method according to claim 1, wherein said function P is parabolic.

5. The method according to claim 1, wherein the differential processing step comprises a sub-step of calculating raw differential signals, during which raw differential signals Vbj(i,t)=Sj(i,t)−Sj−1(i,t) are determined.

6. The method according to claim 1, wherein the differential processing step comprises a sub-step of calculating raw differential signals, during which raw differential signals Vbj(i,t) are determined at least by a high-pass filtering of raw signals Sj(i,t) on j.

7. The method according to claim 5, wherein the differential processing step further comprises a sub-step of determining an envelope, during which the differential signals Vj(i,t) are determined by calculating a temporal envelope of each raw differential signal Vbj(i,t).

8. The method according to claim 7, wherein the sub-step of determining an envelope comprises a calculation of a temporal envelope Vej(i,t) then a low-pass filtering of the temporal envelopes Vej(i,t) on i in order to obtain the differential signals Vj(i,t).

9. The method according to claim 1, wherein the field of observation comprises micro bubbles and the micro bubbles which have disappeared from the field of observation from one measurement step to another are detected, these micro bubbles that have disappeared constituting said differential targets.

10. The method according to claim 9, wherein the incident wave has an amplitude suitable for destroying the maximum number C of micro bubbles in each measurement step.

11. The method according to claim 9, wherein the incident wave emitted in each measurement step has an amplitude suitable for not destroying micro bubbles, and the method further comprises, alternating with the measurement steps, destruction steps during which a destructive ultrasound wave is emitted that has an amplitude suitable for destroying the maximum number C of micro bubbles in each destruction step.

12. The method according to claim 1, wherein the positions $Aj(x0,y0)$ of the successive differential targets are plotted on an image of the field of observation.

13. The method according to claim 12, wherein said image of the field of observation is obtained by ultrasonography using said array of transducers.

14. An ultrasound imaging device comprising an array of transducers controlled by a control and processing device adapted for imaging a field of observation in an environment to be imaged containing scatterers, the control and processing device being adapted for, during a plurality of successive measurement steps:

causing the array of transducers to emit an incident ultrasound wave into the field of observation in each measurement step, then recording raw signals $Sj(i,t)$ picked up by each transducer and representative of a reflected ultrasound wave reverberated from the incident wave by the scatterers of the environment, i being an index denoting each transducer, j being an index denoting each measurement step, and t denoting the time, the array of transducers extending along at least one dimension and the incident waves mainly propagating in a direction of propagation perpendicular to the array of transducers, wherein the control and processing device is adopted to generate a maximum number C of differential targets, differing from one measurement step to another, each differential target being a scatterer which is present in the field of observation during a measurement step and absent during an immediately adjacent measurement step, the number C being at most equal to $INT(A/(5\lambda)^2)+1$, where A is an area of the field of observation, and wherein the control and processing device is further adopted to further carry out the following steps:

a differential processing step during which the raw signals $Sj(i,t)$ corresponding to successive measurement steps of index j are compared in order to extract differential signals $Vj(i,t)$ representative of variations between raw signals from the successive measurement steps, an adjustment step during which at least one function $y=Pj(x)$ corresponding to each differential signal $Vj(i,t)$ is determined, where x is a space variable denoting a position perpendicular to the direction of propagation and y is a coordinate denoting the position of a point along the direction of propagation corresponding to a travel time t, and a positioning step during which a crest $Aj(x0,y0)$ of said function Pj is determined, corresponding to the position of the differential target.

\* \* \* \* \*